United States Patent
Nerella et al.

(10) Patent No.: US 9,414,334 B2
(45) Date of Patent: Aug. 9, 2016

(54) METHODS AND APPARATUS FOR USING WLAN CHIPS TO SUPPORT COMMUNICATIONS IN LICENSED FREQUENCY BANDS

(71) Applicant: PROXIM WIRELESS CORPORATION, Milpitas, CA (US)

(72) Inventors: Nagaraju Nerella, Hyderabad (IN); Phani K Venkata, Secunderabad (IN); Syam Gonnalagadda, Hyderabad (IN)

(73) Assignee: Proxim Wireless Corporation, Fremont, CA (US)

( * ) Notice: Subject to any disclaimer, the term of this patent is extended or adjusted under 35 U.S.C. 154(b) by 26 days.

(21) Appl. No.: 14/250,366

(22) Filed: Apr. 10, 2014

(65) Prior Publication Data

US 2015/0237628 A1    Aug. 20, 2015

(30) Foreign Application Priority Data

Feb. 19, 2014    (IN) .............................. 806/CHE/2014

(51) Int. Cl.
```
H04W 72/04      (2009.01)
H04W 84/12      (2009.01)
H04W 52/52      (2009.01)
H04W 4/00       (2009.01)
```
(52) U.S. Cl.
CPC .............. *H04W 52/52* (2013.01); *H04W 84/12* (2013.01)

(58) Field of Classification Search
CPC . H04W 72/04; H04W 84/12; H04W 72/0453; H04W 52/52

USPC .......................................................... 370/329
See application file for complete search history.

(56) References Cited

U.S. PATENT DOCUMENTS

| | | | | |
|---|---|---|---|---|
| 5,640,691 A * | 6/1997 | Davis | ................... | H03G 3/3047 330/279 |
| 8,805,291 B1 * | 8/2014 | Garcia | .................. | H04W 24/08 455/67.11 |
| 2005/0221764 A1 * | 10/2005 | Shen | ...................... | H04B 17/13 455/67.15 |
| 2008/0242239 A1 * | 10/2008 | Wilson | ................. | H04B 1/0007 455/83 |
| 2011/0175681 A1 * | 7/2011 | Inamori | ................ | H03F 1/0211 330/296 |
| 2012/0270504 A1 * | 10/2012 | Zhang | .................. | H04L 1/0006 455/62 |
| 2014/0094213 A1 * | 4/2014 | Khoshnevis | ........ | H04W 52/383 455/522 |
| 2015/0092661 A1 * | 4/2015 | Huang | ................ | H04W 40/248 370/315 |

* cited by examiner

*Primary Examiner* — Guang Li
*Assistant Examiner* — Faisal Choudhury
(74) *Attorney, Agent, or Firm* — Straub & Pokotylo; Michael P. Straub; Abbas Zaidi

(57) ABSTRACT

Methods and apparatus for using WLAN chips, e.g., WiFi communications chips, to support communications in licensed frequency spectrum which is located outside unlicensed frequency spectrum available for unlicensed WiFi communications, are described. Through the use of low cost WiFi communications chips in frequency bands for which they were not originally intended, low cost communication is achieved in licensed frequency bands. Multimode devices are also possible in which communications may be implemented in either the licensed or unlicensed frequency band using a single WLAN transceiver chip.

11 Claims, 12 Drawing Sheets

| CHANNEL SELECT | F_C (GHz) | SUPPORTED BANDWIDTHS (MHz) |
|---|---|---|
| 0 | 5.900 | 5, 10, 20, 40 |
| 1 | 5.901 | 5, 10, 20, 40 |
| 2 | 5.902 | 5, 10, 20, 40 |
| 3 | 5.903 | 5, 10, 20, 40 |
| 4 | 5.900 | 5, 10, 20, 40 |
| ⋮ | ⋮ | ⋮ |
| N | 5.900+(Nx0.001) | 5, 10, 20, 40 |

FIGURE 7

METHODS AND APPARATUS FOR USING WLAN CHIPS TO SUPPORT COMMUNICATIONS IN LICENSED FREQUENCY BANDS

FIELD

The present application relates to wireless communications systems and, more particularly to methods and apparatus for providing radio devices which are suited for use in a licensed frequency band and which are based, at least in part, using one or more wireless local area network (WLAN) chips or circuits that support one or more WLAN communications protocols commonly used for communications in unlicensed frequency bands.

BACKGROUND

Licensed radio resources are limited and expensive to develop. Various companies pay a premium to obtain licensed spectrum from the regulatory authorities so that they can provide cellular services to their customers. Unlicensed radio resources on the other hand are cheaper in comparison and the number of devices, e.g., WiFi (e.g., IEEE 802.11 compliant) devices, often tends to be large with the devices being relatively inexpensive in many cases due to the high volume of production.

While WiFi chips tend to be relatively inexpensive, they are designed to operate in particular frequency bands. Licensed frequency bands are normally outside the frequency bands used for WiFi and for which WiFi chipsets are designed.

In order to use licensed frequency bands it is often necessary to use custom equipment and/or chipsets designed for the specific licensed frequency band. Such chipsets can be expensive due, in many cases, to the cost of designing a receiver/transmitter chip for a particular frequency band and what is often a relatively low production volume compared to the more common WiFi chips.

In view of the above discussion it should be appreciated that there is a need for improved methods and/or apparatus which can be used to implement receiver/transmitters and/or other radio communications equipment in a more cost efficient manner than is currently the case where custom chipsets are designed and used for a licensed frequency band.

It would be desirable if some, but not necessarily all embodiments could take advantage of relatively readily available WLAN chips intended to support communications in unlicensed spectrum, for example, IEEE 802.11 WiFi, capable chips, in a hardware and/or cost effective manner to support communications in licensed frequency bands, e.g., outside the normal unlicensed WiFi frequency bands.

SUMMARY OF THE INVENTION

Methods and apparatus which allow WLAN (Wireless Local Area Network) chips, e.g., chips compliant with one or more IEEE 802.11 standards, to be used to support communications outside the normal WLAN, e.g., WiFi frequency bands, for which the chips are designed are described. The methods and apparatus allow a WiFi receiver/transmitter chip to be paired with additional circuitry and/or control logic, e.g., implemented in a dedicated circuit or a processor, to provide a cost effective radio transceiver device that can be used in one or more bands outside the normal WiFi frequency bands.

In various exemplary embodiments operation in frequency bands outside the normal WiFi frequency bands is achieved via control of an oscillator signal in the WLAN chip via, e.g., a channel select value, in combination with one or more bandpass filters and power amplifiers in receiver/transmitter paths coupled to the WLAN chip.

In some but not necessarily all embodiments, e.g., in at least some embodiments where the frequency band to be used for transmission is outside the frequency band for which the WLAN chip being used was designed to operate, the WLAN chip may not power amplify the frequencies in a uniform manner across the frequency spectrum being used for transmission purposes, e.g., licensed frequency spectrum. This is not surprising since the WLAN chip was not intended to operate in the frequency band for which it is being used and thus may not include power amplifiers suitable for uniform amplification of signals at the various frequencies in a licensed frequency band.

In at least some embodiments to compensate for the non-uniform power output of the WLAN chip with respect to frequency, a frequency dependent attenuator is used to process the output signal from the WLAN chip prior to power amplification that occurs external to the WLAN chip. The attenuator maybe, and in various embodiments is, configured to attenuate different frequencies included in signal differently so that the power for the different frequencies at the output of the attenuator is relatively uniform across the frequency band into which the signals are to be transmitted.

The attenuator may be pre-configured based on knowledge of the WLAN chips frequency response in the frequency band in which the transmissions are to be made. Such knowledge maybe made by measuring the frequency response prior to implementation of the radio system or device incorporating the WLAN chip. Given that the frequency response of chips of the same design tends to be relatively uniform, the attenuator configuration can be determined and fixed at the time of manufacture of a particular device and frequency characteristics of individual WLAN chips need not be made although such measurements possible. In embodiments where different frequency bands may be supported, a configurable attenuator may and in some embodiments is used with the configuration for each frequency device being stored, e.g., in memory, and used to configure the attenuator when the frequency band to be used is determined, e.g., selected by a user and/or based on other information such as which frequency bands are available for use at the geographic location of the radio device. As should be appreciated the location may be fixed, entered by a user or determined through automated methods such as through use of a GPS receiver.

While in some embodiments the radio device supports a single frequency band, in multi-band embodiments such as embodiments which support communication in unlicensed frequency spectrum and licensed frequency spectrum the attenuator is configured based on which frequency band is being used. For example when operating in a WiFi frequency band in which the WLAN chip was designed to operate the attenuator may apply no attenuation but when operating in a licensed frequency band, e.g., outside the frequency range for which the WLAN chip was designed, attenuation may be applied to one or more frequencies to compensate for the non-uniform amplification and thus power level of the signal output by the WLAN chip for transmission.

The post attenuation amplification performed prior to transmission is performed using an amplifier which amplifies signals in the frequency bands supported by the wireless communications device in a relatively uniform manner. Thus, by equalizing the power levels of the different frequencies prior to amplification, a signal is created for transmission with relatively uniform power across the frequency band in which the transmission is being made.

Use of a frequency up and/or down converter outside the WLAN chip is expressly avoided in at least some embodiments.

By avoiding the use of a frequency up/down converter and controlling the clock of the WLAN chip so that its output is in the desired frequency band, lower order filters can be used in the transmitter and/or receiver paths than would normally required as compared to the case where an external frequency up/down converter is used.

For example, second order or lower order filters maybe used in the receiver and/or transmitter paths rather than a seventh or higher order filter that might normally be required to remove undesirable harmonics that occur when a frequency up/down converter is used.

While avoiding the use of a frequency converter to convert from the frequency band output by a WLAN chip operating in its normally frequency band can be advantages from a cost perspective since the frequency converter is avoided and potentially lower order, and thus less expensive, filters can be used than when a frequency converter is used, the methods and apparatus of the present invention tend to lead to more uniform power characteristics over a wider range of frequencies, particularly in embodiments where a frequency dependent attenuator is used prior to amplification, since filters need not be used to notch out or eliminate undesirable harmonics which might be created if a frequency up/down converter was used.

In view of the above it should be appreciated that the methods and apparatus of the present invention allow for relatively low cost WiFi and/or other WLAN chips to be used in frequency bands other than for which they were originally intended while still providing desirable power and spectral characteristics at with low or reasonable hardware costs particular as compared to systems which are based on custom transceiver chip designs and implementations.

While the methods and apparatus described herein allow for communications in licensed spectrum, given that the apparatus are based on WLAN chips, e.g., WiFi chips, the devices in at least some embodiments can be easily switched between licensed frequency spectrum use and unlicensed frequency spectrum use, e.g., through software control.

Accordingly, not only do the apparatus provide for low cost devices which can use licensed spectrum outside the normal WiFi communications bands which are unlicensed, the devices in some but not necessarily all embodiments can easily switch between use of unlicensed and licensed frequency bands.

Numerous embodiments and variations on the described embodiments are possible and will be apparent in view of the detailed description which follows.

BRIEF DESCRIPTION OF THE FIGURES

FIG. 7 illustrates a table showing configuration settings used to configure a WLAN chipset in accordance with the invention to achieve various desired custom bandwidths and data rates supported in one exemplary embodiment.

DETAILED DESCRIPTION

Figure 1:
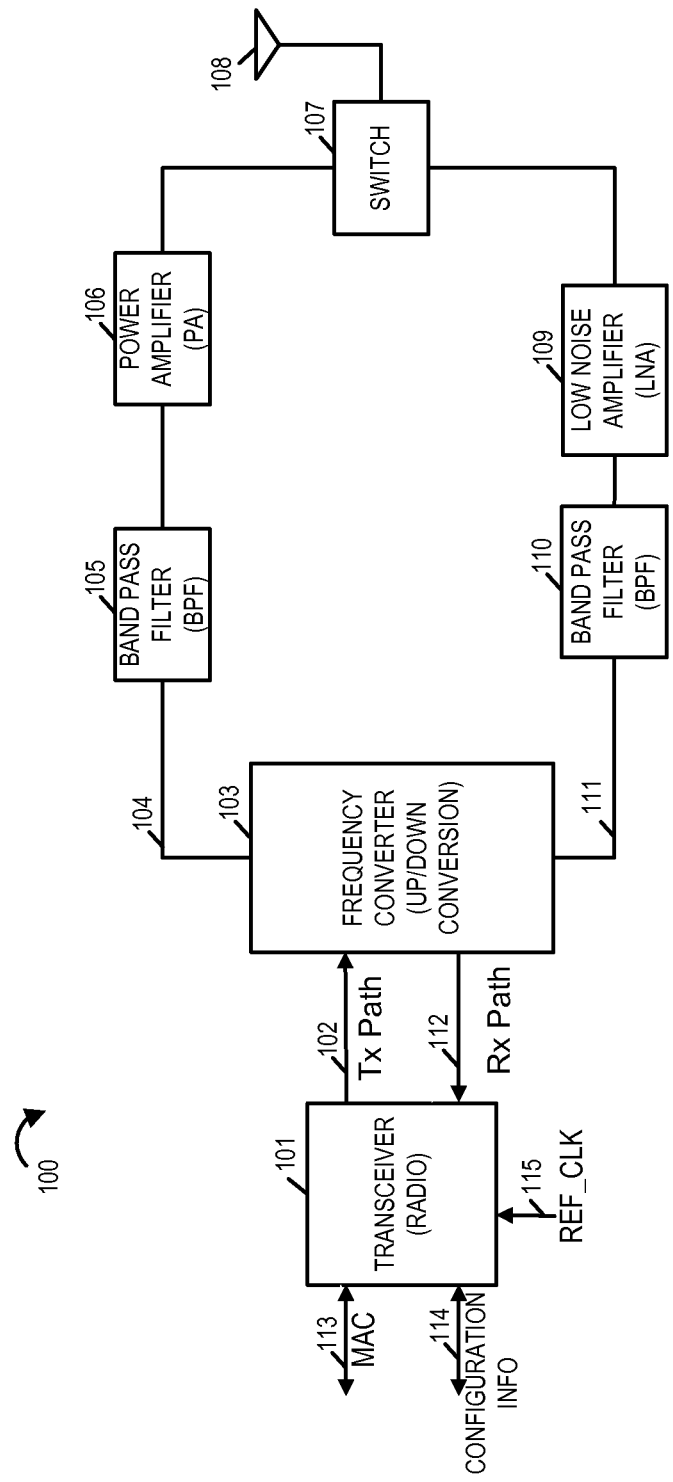
FIG. 1 illustrates a first system which uses a WLAN transceiver in combination with an external frequency converter to support communications in a frequency band outside the unlicensed frequency band for which the WLAN transceiver was intended.

WLAN chipsets are generally designed for the unlicensed frequency bands such as the 2.4-2.5 GHz and 4.9-5.9 GHz bands. To support other frequency bands with a WLAN based chipset, a frequency conversion system maybe employed such as the one shown in FIG. 1. FIG. 1 illustrates a block diagram of a system that uses a WLAN transceiver and a frequency conversion circuit to support communications in a frequency band outside the 2.4-2.5 GHz band and 4.9-5.9 GHz band which the WLAN receiver 101 was designed to operate.

The system 100 illustrated in FIG. 1 includes a WLAN transceiver 101 which has input/outputs 113 for receiving/sending information, i.e., data corresponding to the MAC (Media Access Control) layer which is received or transmitted. The data may be supplied to another element such as a process for use by an application which uses the radio device shown in FIG. 1 for communications purposes. Configuration information 114 is communicated to the transceiver via a separate configuration input. Another input to the WLAN block 101 is the REF_CLK 115 which is the crystal oscillator reference frequency from a crystal oscillator that is used to control the timing of the transceiver and thus the sampling of receive signals as well as the frequency of signals 102 to be transmitted. The WLAN transceiver 101 receives radio signal input via the receive (Rx) path 112 as shown in the figure. The radio output from the WLAN transceiver 101 is indicated by the transmission (Tx) path 102.

The data path 113 represents an input which provides data, i.e., information to be transmitted by the transceiver or data recovered from decoding radio signals received via Rx path 112. Configuration input includes control information (represented by arrow 114) that is used for controlling the system 100 and includes the following: a Transmit/Receive control signal indicating whether the transceiver it to operate in a transmit mode or a receive mode of operation, Channel_select control indicating which of a plurality of supported radio channels is to be used and a Bandwidth_select control indicating the width, in terms of frequency, of the channel which is to be used.

Tx path 102 indicates the path of signals along the circuit 100 processed for transmission via the antenna 108, with the transmit frequency of the signals output by the transceiver to the frequency converter 103 being in the range of 4.95-5.45 GHz.

The Frequency converter 103 performs frequency conversion operation to up or down convert the frequency of the signal that is supplied as an input to the converter 103. In the case of transmitter operation the input to the frequency converter is 4.95-5.45 GHz with the output 104 of the frequency converter 103 on the transmit path being a signal in the frequency range of 5.9-6.4 GHz. Thus, in the transmit path the frequency converter performs an up conversion in this example. The up conversion process may be implemented by performing a mixing operation with signal being transmitted being mixed with another signal to produce an output signal for transmission in the 5.9 to 6.4 GHz range corresponding to licensed spectrum. It should be appreciated that an undesired consequence of the mixing operation is harmonics corresponding to multiple of the two input frequencies which were mixed as part of the up conversion process.

In order to filter out the undesired harmonics, a bandpass filter 105 is used prior to power amplification by the amplifier 106. It should be appreciated that the filer 105 to be effective and achieve the desired spectral characteristics needs to have relatively sharp roll offs in the frequency domain and may be implemented with a seventh or higher order filter. Such high order filters can be costly to implement as compared to lower or filters.

The output of the power amplifier 106 is supplied to switch 107 which couples the transmitter chain including elements 103, 105 and 106 to the antenna when the device 100 is operating in transmit mode.

When operating in receive mode, the switch 107 is configured to couple the antenna 108 to a low noise amplifier 109, a bandpass filter 110 and the radio receive input of the frequency converter 103. The frequency converter 103 receives and processes input 111 which in the FIG. 1 example is a 5.9-6.4 GHz frequency received signal that was received, amplified and filtered prior to being supplied to the frequency converter for down conversion to the 4.95 to 5.45 GHz frequency band at which the transceiver 101 operates. The received radio signal is processed by the frequency converter and is downconverted as part of the processing. The resulting downconverted signal is output from frequency converter 112 via the receive path 112 as an output signal with frequency of 4.95-5.45 GHz. The transceiver block 101 receives this signal and processes the signal as a received radio signal would normally processed.

While the above architecture illustrated in FIG. 1 may be used to support communications in a licensed band outside the unlicensed 4.95-6.4 GHz spectrum, in order to achieve acceptable performance, e.g., to meet regulatory standards, the system 100 employs expensive hardware resources, e.g., a relatively costly filter 105, for minimizing the effect of undesired spurious frequencies generated in the operation due to the use of the frequency converter 103.

In terms of frequency, the undesirable harmonics generated by the frequency converter 103 maybe very close to the desired frequencies and are very difficult to reject without significant damage to the frequencies of interest. In order to meet acceptable performance requirements, the system 100 employs high rejection filters, such as the 7th or higher order bandpass filter employed in system 100, which are expensive and can also introduce a great deal of signal loss.

While the use of one or more high quality, e.g., high order, filters in a system such as the shown in FIG. 1 can achieve acceptable transmission interference characteristics, the power characteristics will be less smooth than desired due to the use of the filters and over the range of frequencies being used a fair amount of power variation may occur with respect to transmission frequency due to filter attenuation required to filter out harmonics caused by the up conversion process.

Accordingly it should be appreciated that there is a need for improved methods and apparatus for obtaining desired licensed band frequencies using existing WLAN hardware in a cost effective manner.

Figure 2:
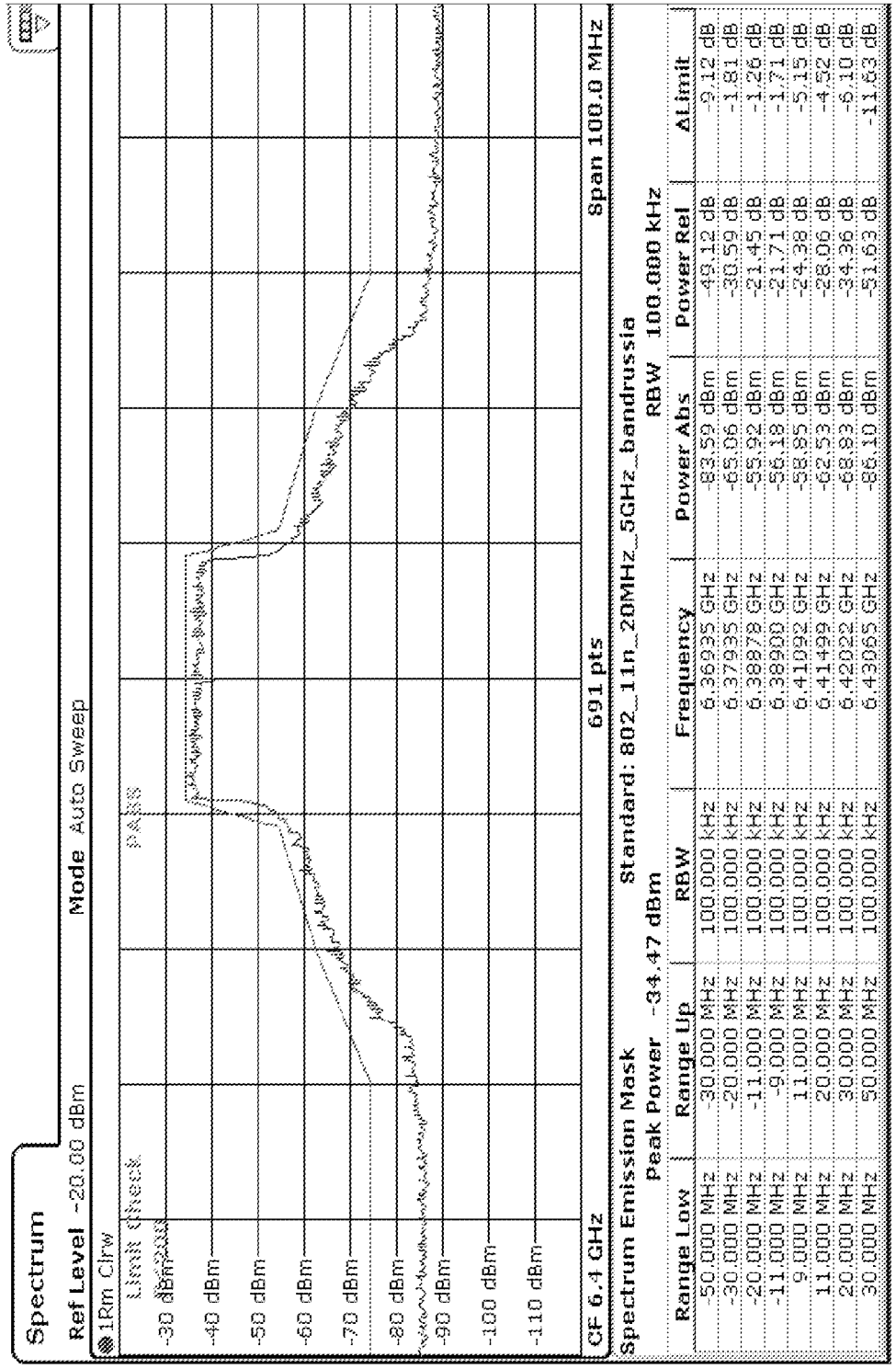
FIG. 2 shows a spectral response of the system shown in FIG. 1.

FIG. 2 is a drawing 200 illustrating the spectral mask simulation results generated using a spectrum analyzer for frequency bandwidth obtained when system 100 is used. While frequency characteristics may be satisfactory for various applications, as noted above high quality filters are required to achieve such a spectral shape with respect to the carrier frequency being used which can be costly.

Figure 3:
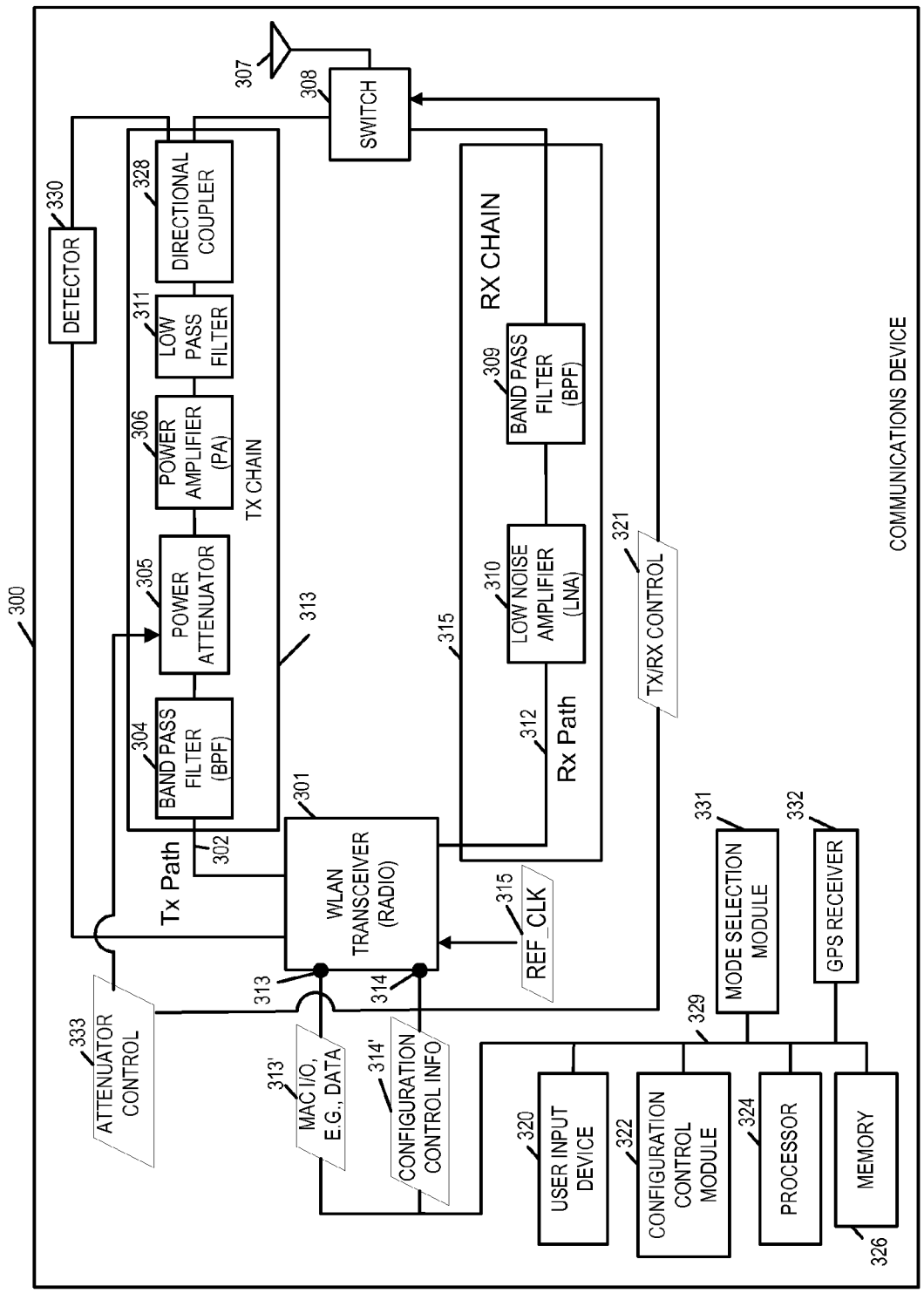
FIG. 3 illustrates an exemplary communications device implemented in accordance with the invention which uses a WLAN transceiver in combination with a reference clock signal that causes the transceiver to operate in a transmission and reception frequency band outside the normally unlicensed frequency spectrum during at least some periods of time.

FIG. 3 illustrates an exemplary communications device 300 implemented in accordance with an exemplary embodiment of the present invention. The device 300 maybe a user device, e.g., cell phone, wireless data device, tablet device or some other type of user device with a radio interface and which may be mobile or stationary. The device 300 may also be a base station or other network attachment device, e.g., a device through which a user device can gain wireless access to an infrastructure network. The exemplary communications device 300 avoids the use of a frequency up/down converter outside the WLAN transceiver 301. By avoiding the use of a up/down frequency converter, the need for high order filters in the signal transmit path to reduce or eliminate undesired harmonics associated with use of a frequency converter can be, and an in various embodiments are, avoided.

The communications device 300 shown in FIG. 3 supports communications in the desired frequency bands, e.g., the 4.95-6.4 GHz freq bands, which may be a licensed spectrum bordering an unlicensed spectrum, without the use of or need for frequency conversion circuits external to the WLAN transceiver 301. Since various aspects eliminate the need for or use of a frequency conversion circuit, such as the circuit 103 shown in FIG. 1, the undesired harmonics generated by the use of such a frequency conversion circuit which are difficult to reject are avoided. However, the system shown in FIG. 3 still allows for the generation of signals in the desired frequency band using a relatively inexpensive WiLAN chip, e.g., a WiFi chip or other chip or chipset. The transceiver chip 301 is, at least in some embodiments, compliant with one or more of the IEEE 802.11 communications standards.

From a signalling level perspective, the WiFi transceiver communications capabilities can be used even though the device is operating outside the normal frequency bands used for unlicensed communication. The use of standard WiFi communications protocols in the licensed band avoids the need for customized air interfaces associated with many custom chip implementations associated with licensed frequency spectrum use.

The architecture shown in FIG. 3 delivers the desired frequency of operation in a frequency band, e.g., 4.95-6.4 GHz, outside the normal unlicensed spectrum for which transceiver chip 301 was originally designed for, e.g., outside the 4.95-5.45 GHz band that normally corresponds to unlicensed spectrum. It should be appreciated that the frequency bands described herein are exemplary and that the methods and system shown in FIG. 3 could be used to support communication in other frequency bands and may be implemented using chips intended for use in unlicensed spectrum other than the 4.95-6.4 GHz spectrum commonly used for IEEE 802.11 communications.

In accordance with one aspect of the invention the radio frequency can be tuned to the desired frequency band by adjusting the frequency of a frequency synthesizer, e.g., Phased Lock Loop (PLL) circuit, included in the transceiver 301 by controlling one or more inputs to the WLAN transceiver chip or chipset 301. The controllable inputs include a channel select value which can be used to indicate which frequency channel, and thus what frequency band, is to be used for communications. A bandwidth select value can be used to specify the width of the frequency band to be used, e.g., centred around the carrier frequency fc of the communications channel indicated by the channel select value. The channel select and bandwidth select values may be specified by a user or may automatically determined based on the communications needs of the application which channels are available in the geographic location where the device 300 is located. Configuration information and channel availability information may be stored in memory 326.

Figure 9:
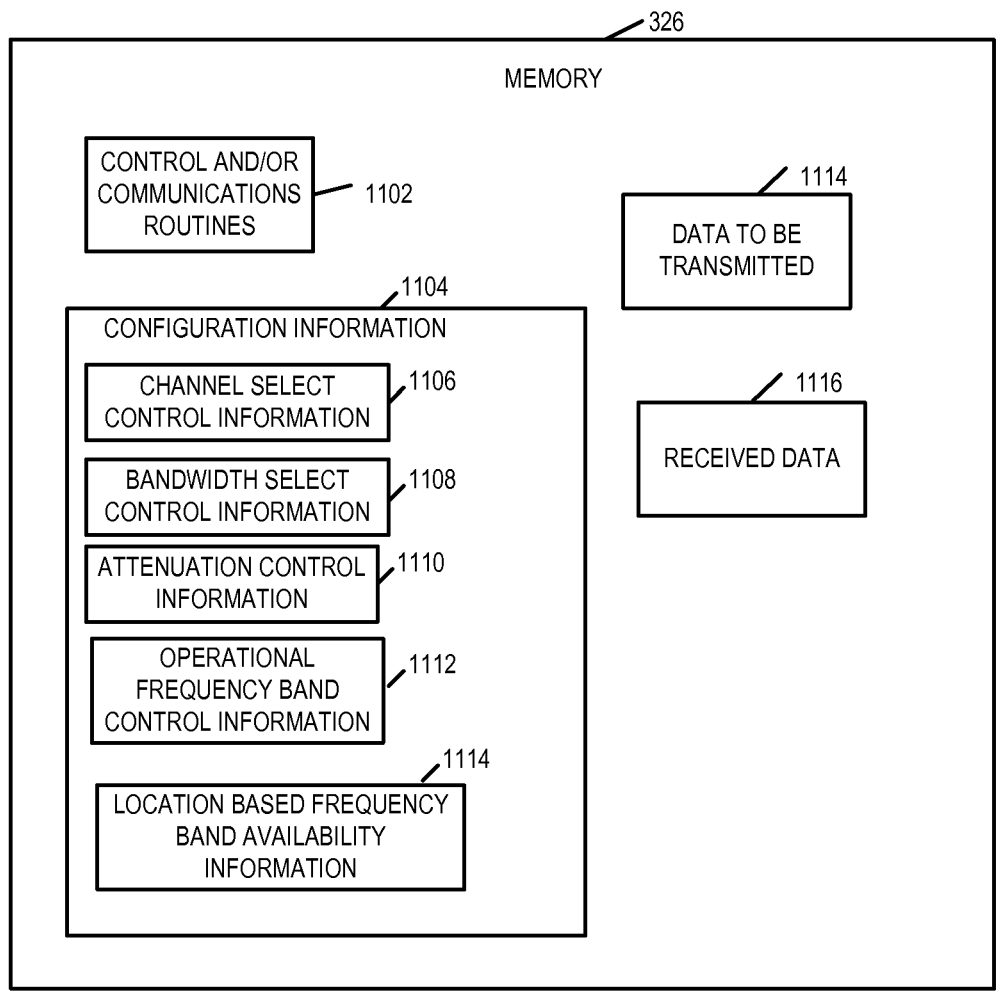
FIG. 9 illustrates an exemplary memory and its contents which may be used in the exemplary device of FIG. 3.

Referring briefly to FIG. 9, an exemplary memory 326 is shown. The memory, e.g., a RAM or ROM, includes control and/or communications routines 1102 which may be executed by a processor, e.g., processor 324, to control operation of the device in which the memory is included, e.g., device 300. The memory 326 also includes a set of configuration information 1104 which includes channel select information 1106 used in selecting or determining what communications channel should be used at a particular point in time or at a given location, bandwidth select control information 1108 which may be used to determine which bandwidth option should be selected at a point in time, e.g., based on data transmission/reception needs or bandwidth availability in an area, attenuation control information 1110 which specifies attenuation configuration information used to configure power attenuation 305 depending on the frequency band and/or mode of operation being used and operation frequency band control information 1112 which may include information on what frequency bands are available in given geographic regions. In addition to the configuration information 1104, the memory includes data to be transmitted 1114 and received data 1116. The data to be transmitted may include data waiting to be transmitted by device 300 over the radio/air interface while the received data may be data which was received over the air link interface, e.g., radio interface of device 300.

The various components and features of the exemplary device 300 will now be described. The exemplary device 300 includes a WLAN transceiver 301, e.g., an 802.11 compliant transceiver chip, a GPS (Global Positioning Receiver) 301, a bandpass filter 304, a power attenuator 305, a power amplifier 306 and a direction coupler in a transmission path 302 which is coupled to the antenna 307 via controllable switch 308. The bandpass filter 304, digital attenuator 305, power amplifier 306, low pass filer 311 and directional coupler form what is sometimes referred to as a transmit chain 313. The bandpass filter may 304 may be a relatively low order filter, e.g., third or lower order filter. A second order filter is used in some embodiments while a first order filter is used in other embodiments. Use of a low order filter in the transmit chain is possible given that the filter 304 need not deal with harmonics generated by an up conversion device such as the frequency converter 103 used in the FIG. 1 embodiment.

The receiver chain 313 is implemented in a manner that avoids the need for high order filters and also addresses an issue that can arise from operating the WLAN receiver 301 to generate signals in a frequency band outside the unlicensed frequency band for which it was originally designed. When operating in frequency band outside the frequency band for which it was designed, the WLAN receiver may generate signals with a power per frequency distribution that is non-uniform. This can be the result of operating the transceiver 301 to perform internal amplification operations in a frequency band beyond that which the WLAN transceiver was expected to operate. While the signal output of the WLAN transceiver will normally not have a relatively flat uniform power per frequency characteristic, the power per frequency characteristics are predictable for a given frequency band. Thus, prior to construction of the device 300, it is possible to know which frequencies of the signal generated by the WLAN receiver in the licensed frequency band will tend to be of higher power than other frequencies in the licensed frequency band.

In at least some embodiments, after band pass filtering by the bandpass filter 304, the signal to be transmitted which was output by the WLAN transceiver is subject to attenuation at one or more frequencies by the power attenuator 305. The frequencies and amount of attenuation at a given frequency applied by attenuator 305 is based on the knowledge of the power characteristics of the WLAN transceiver 301 with respect to the frequency band in which the signal to be transmitted corresponds. In the case where a single transmit frequency band is supported, attenuator 305 may be preconfigured for the single supported transmit band. When multiple transmit frequency bands are supported, attenuator 305 is implemented as a configurable device which can be configured based on attenuation coefficients for different frequencies that may be supplied by configuration control module 322 as a set of attenuator configuration information 333. The attenuation configuration maybe, and in some embodiments is, based on which frequency band is being used at a particular point in time for transmission purposes. Sets of attenuation information for different frequency bands may, and in some embodiments are, stored in memory 326 with the appropriate attenuator configuration information 333 being supplied to attenuator 305 on an as needed basis, e.g., when the frequency band used for transmission is changed.

Note that in embodiments where the device 300 supports an unlicensed mode of operation and a licensed mode of operation, WLAN transceiver 301 will normally generate a signal to be transmitted which will have a relatively uniform power with respect to frequency. This is because the WLAN transceiver 301 was designed, at least in some embodiments, for use in the unlicensed frequency band. In at least one such embodiment the attenuation control information 333 configures the power attenuator 305 to perform no attenuation when device 300 is operating in an unlicensed frequency band. However, when operating in a licensed frequency band, attenuator configuration information 333 will normally configure the power attenuator 305 to attenuate one or more frequencies of the signal to be transmitted to achieve a more uniform power distribution across frequencies before power amplification by power amplifier 306. The power amplifier 306 may be a single or multi-stage power amplifier with generally uniform amplification characteristics across the frequency band or bands in which a signal may be transmitted. Thus, the power amplifier 306 may support uniform amplification over a wider frequency range than the internal amplifiers of WLAN transceiver 301 that was perhaps intended to support a smaller or different transmit frequency range than may be used in the device 300. The amplified signal to be transmitted generated by power amplifier 306 is subject to low pass filtering by filter 311 prior to being passed to direction coupler 326. The directional coupler couples a portion of the transmit signal to power detector 339 without interfering with the signal to be transmitted which is supplied to a transmit input of switch 308. When in a transmit mode of operation, switch 308 couples the output of the transmit chain 313 to the antenna 307 so that the signal to be transmitted which is output by the transmit chain 313 will be supplied to and transmitted by antenna 307.

It should be noted that the output of coupler 328 is supplied to power detector 303 which in turn is coupled to a power feedback control in put of the WLAN transceiver 301. In this way the WLAN transceiver is provided with power level information than could be obtained from simply feeding back the transmit output of the WLAN receiver to the power control feedback look since the power information provided by detector 330 will reflect the affects of both the power attenuator 305 and the power amplifier 306 on the signal to be transmitted.

In receive mode of operation, switch 308 is responsive to transmit/receive control information 321 to couple the antenna 307 to the input of the Receive chain 315 rather than to the output of the transmit chain 328. The bandpass filter 309 and amplifier 310 form receiver chain 315.

The device 300 includes a receiver path 312 is coupled to the output of RX chain 315. The Rx chain 315 includes bandpass filter 309 and a low noise amplifier 310 which are coupled by the switch 308 to the antenna 307 when the device 300 is operating in a receive mode of operation. Via receive chain 315 signals received via antenna 307, e.g., in the frequency band in which communication is being implemented, are communicated to the receive input of the WLAN receiver 301.

In addition to the elements of the receive and transmit chains, the communications device further includes a user input device 320, a configuration control module 322, a processor 324, memory 326, mode selection module 331 and GPS receiver 332 with the various elements of the device 300 being coupled together by a bus 329 over which information, including data and configuration information, can be exchanged. In various embodiments the processor 324 controls the communications device to operate in accordance with the present invention and to implement various communications protocols. While in some embodiments processor 324 controls communications operations, in some embodiments configuration control is implemented by module 322 using configuration information stored in memory 326. Mode selection module 331 determines the mode of operation to be used at a particular point in time. This may include the frequency band to be used and/or whether the device is operate in a transmit or receive mode of operation at a particular point in time. The mode selection module 331 may determine the frequency band to be used, and thus whether the device is to operate in an unlicensed spectrum mode or licensed spectrum mode based on user input and/or location information provided by GPS receiver 332. For example, licensed modes of operation may be used when in an area where licensed spectrum is known to be available while unlicensed spectrum may be used when in an area in which licensed spectrum is not available.

While modules 322 and 331 may be implemented as a software module executed by processor 324 in some embodiments these modules are implemented in hardware, e.g., as a circuit.

The amount of bandwidth to be used, e.g., 5, 10, 20 or 40 MHz, at a given time may be made by mode selection module 331 and/or configuration control module 322. The selection of the bandwidth to be used, and thus the bandwidth select value to be specified by configuration control module 322 may be based on the amount of bandwidth available in a geographic region or, in some embodiments, the amount of data to be transmitted and/or received. For example, larger bandwidths may be used when more data is to be received/transmitted in a particular period of time than when less data is to be transmitted/received in the same amount of time.

The user input device 320 may be a keypad, touch screen, and/or other device for receiving and processing input commands/instructions. Such input can include user input provided to determine the mode of operation, e.g., licensed frequency band or unlicensed frequency band, to be used and/or other control or configuration parameters. The configuration control module 322 provides configuration information 314' including control inputs to various elements of the device 300 to control their respective operation in accordance with the invention. In some embodiments the configuration information 314' includes Transmit/Receive control information 321 used to indicate whether the device is operating in transmit or a receive module of operation, channel_select control information 515 used to indicate the frequency (fc) of the channel to be used and/or bandwidth_select control information 516 used to indicate the width in terms of frequency of the channel to be used. The configuration information 314' may also include attenuator control information 333 used to configure the power attenuator for a particular frequency band, e.g., the transmission frequency band to be used at a particular point in time.

In addition, depending on the embodiment, the configuration information may include control information that is supplied to and used to configure band pass filter 304, power amplifier 306 and low noise amplifier 310. Accordingly while configuration inputs to elements 304, 306 and 310 are not shown in the FIG. 3 embodiment in at least some embodiments configuration information is supplied from the bus 329 to such elements which are configurable and which operate in accordance with the indicated configuration information. For example bandpass filter 304 maybe be configured to the frequency band around the carrier frequency indicated by the configuration information and to block other frequencies which are not to be transmitted. However, in other embodiments the filters may be fixed, e.g., wide enough to pass various frequency band which may be used, and in such cases the filters need not be configured on a per band or mode of operation basis.

The processor 324, e.g., a CPU, executes control routines and one or more modules which may be included in the memory 326. Under control of such modules the processor 324 controls the device 300 to operate in accordance with the invention. Such control may include encoding and/or decoding transmitted in accordance with one or more communications protocols which are supported by the device 300. While 802.11 protocols are normally used in unlicensed frequency bands, in some embodiments the processor 324 supports transmission in both licensed and unlicensed frequency bands using 802.11 methods for both encoding and decoding as well as error correction to the extent that it is supported. The memory 326 in some embodiments includes routines and data/information. The routines include communications and device control routines for controlling the device to perform various communications operations and implement various communications protocols. The data/information may be used by the processor 324 to control device operation and/or implement various functions.

The WLAN transceiver 301 exchanges information with the MAC and/or application layer via an interface 313 as illustrated by box 313' which represents MAC level I/O, e.g., the communication of data. The WLAN transceiver 301 receives configuration information 314' via the interface 314 as illustrated. The configuration information 314' is an output of the configuration control module 322 and includes control information that is used for controlling the operation of WLAN transceiver 301, switch 308 as well as other elements of the communications device 300 such as the filter 304 in at least some embodiments. Configuration control information 314' includes transmission/reception control information 321 that is used to control the switch 308 to select between transmit and receive paths so that transmission or reception can be performed as well as channel select information and bandwidth select information.

The WLAN transceiver 301 also receives radio signal input via the receive (Rx) path 312 shown in the figure, e.g., a received signal may reach the WLAN transceiver 301 via the Rx path 312. Another input to the WLAN block 301 is the REF_CLK signal which is an oscillator reference signal generated by a crystal oscillator also referred to as a REF_CLK 315. The REF_CLK frequency may be fixed or software controllable depending on the WLAN chip 301 being used.

A signal to be transmitted that is generated by the WLAN transceiver 301 is output via the transmission (Tx) path 302 which is part of the transmitter chain which includes bandpass filter 304, power amplifier 306 and switch 308 and antenna 307 when the device 300 is operating in transmit mode. The MAC I/O 313' may include data which is to be processed and transmitted using, e.g., the licensed frequency spectrum or unlicensed frequency spectrum depending on whether the device is operating in a mode which uses licensed or unlicensed frequency bands.

Tx path 302 indicates the path of signals as they are processed by various elements of the device 300 before transmission via the antenna 307, with the transmit frequency used in the transmission path being 5.9-6.4 GHz in some embodiments. Note that in such an embodiment, the WLAN chip generates the signal to be transmitted directly with the WLAN chip output being in the 5.9 to 6.4 GHZ range.

The Bandpass filter 304 passes the frequencies in the desired frequency band range, e.g., passing 5.9-6.4 GHz band, and rejects other frequencies, i.e., frequencies which the device 300 does not use for transmitted signals. The Power Amplifier (PA) 306 amplifies a received input to generate an amplified output accordingly. As shown the PA 306 receives the input from the power attenuator 305 and generates the amplified output which is supplied to the switch 308 after passing through low pass filter 311 and coupler 328. The Switch 308 allows the selection between transmit or receive signals based on the Tx/Rx control information 321. The signals are received and transmitted via the antenna 307, e.g., on the selected operational frequencies corresponding to the licensed or unlicensed frequency bands to be used.

Along the reception path, while a low noise amplifier (LNA) 310 is used, which takes the input from the switch 308 and amplifies the signal and deliver it to the WLAN block 301 use of a high order, e.g., seventh or higher order bandpass filter avoided. This is in contrast to the system 100 where such a high rejection filter may be unavoidable due to the generation spurious frequencies and their potential transmission as a result of the use of the up/down frequency converter external to the WLAN transceiver 301. Furthermore, while the bandpass filter 304 is used in the transmission path 302, the rejection requirements for the bandpass filter 304 may not be as stringent when compared to the rejection requirements for the filter 105 of system 100. Since the frequency rejection requirements are not as stringent, the cost of the bandpass filter 304 is normally less than that of the bandpass filter 105, this may be because filter 304 may be implemented using a lower order filter, e.g., a second or first order filters, rather than the higher order, e.g., 7th order, filter 105.

The above discussed features allow device 300 to generate the desired licensed frequencies using WLAN hardware in a much more cost effective manner and potentially better transmission power characteristics, then device 100 shown in FIG. 1.

Figure 4:
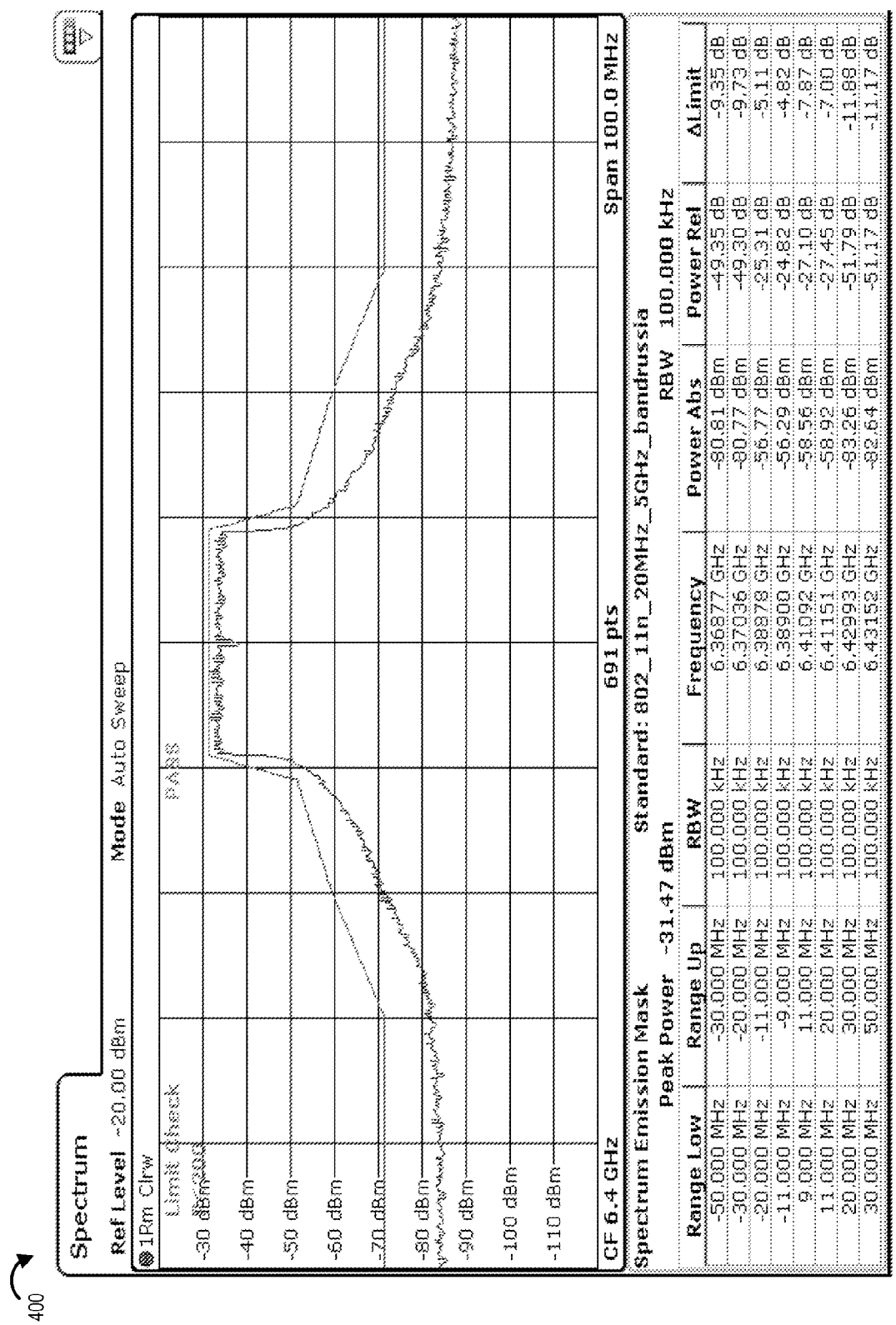
FIG. 4 illustrates the spectral response of the system shown in FIG. 3.

FIG. 4 is a drawing 400 illustrating the spectral mask simulation results generated using a spectrum analyzer for frequency bandwidth obtained when system 300 is employed.

In order appreciate the results shown in FIGS. 2 and 4, an understanding of the following Spectrum Analyzer Terminology is helpful. The following are definitions/explanations of some of the terminology:

Ref level (dBm): Ref level shows power level at the top of the screen. It enables the level of gain to be controlled to allow the signal to be positioned correctly on the vertical scale on the display.

Sweep time: Rate at which frequency is sweep or time required to sweep the LO frequency across the displayed frequency span. The slower the sweep time, obviously the longer it takes for the measurements to be made.

Center Frequency (fc) (GHz): The frequency of the centre of the scale to the chosen value. This is the frequency that is in the middle of the display's frequency axis. It is normally where the signal to be monitored would be located.

Span (MHz): Span specifies the range between the start and stop frequencies. Center frequency and span allow for adjustment of the display within the frequency range of the instrument to enhance visibility of the spectrum measured.

Peak power (at fc) (dBm): Peak power is a measurement of the power level at a specific frequency. In other words it can make a measurement of the carrier power level, for example, without the addition of any spurious signals, noise, etc.

IF bandwidth or RBW (KHz): The resolution bandwidth (RBW) adjusts the resolution of the spectrum analyzer in terms of the frequency. Choosing a narrow resolution on the spectrum analyzer will enable signals to be seen that are close together. It will also reduce the noise level and enable smaller signals to be seen.

Video bandwidth or VBW (KHz): The video filters enable a form of averaging to be applied to the signal. This has the effect of reducing the variations caused by noise and this can help average the signal and thereby reveal signals that may not otherwise be seen.

Range Low (MHz): This is the lower limit of the frequency offset in the spectral mask. (Ex: fc−9 MHz)

Range Up (MHz): This is the upper limit of the frequency offset in the spectral mask. (Ex: fc+9 MHz)

Frequency (GHz): The frequency (fm) where power measured in the spectral mask within the limits.

Power Abs (dBm): This is the absolute power measured at frequency (fm) in the spectral mask limits.

Power Rel (dB): This is the relative power measured at frequency (fm) with relative to the peak power at fc.

Δ Limit (dB): This is the delta power from the measured power (i.e., Power Abs) to the standard power defined in the spectral mask limits.

The WLAN transceiver 301 includes various elements which are controlled so that the transceiver 301 generates a transmission signal in the frequency band to be used, e.g., a licensed frequency band, and with the desired width as well as processes signals received in the frequency band to be used for reception purposes.

Figure 5:
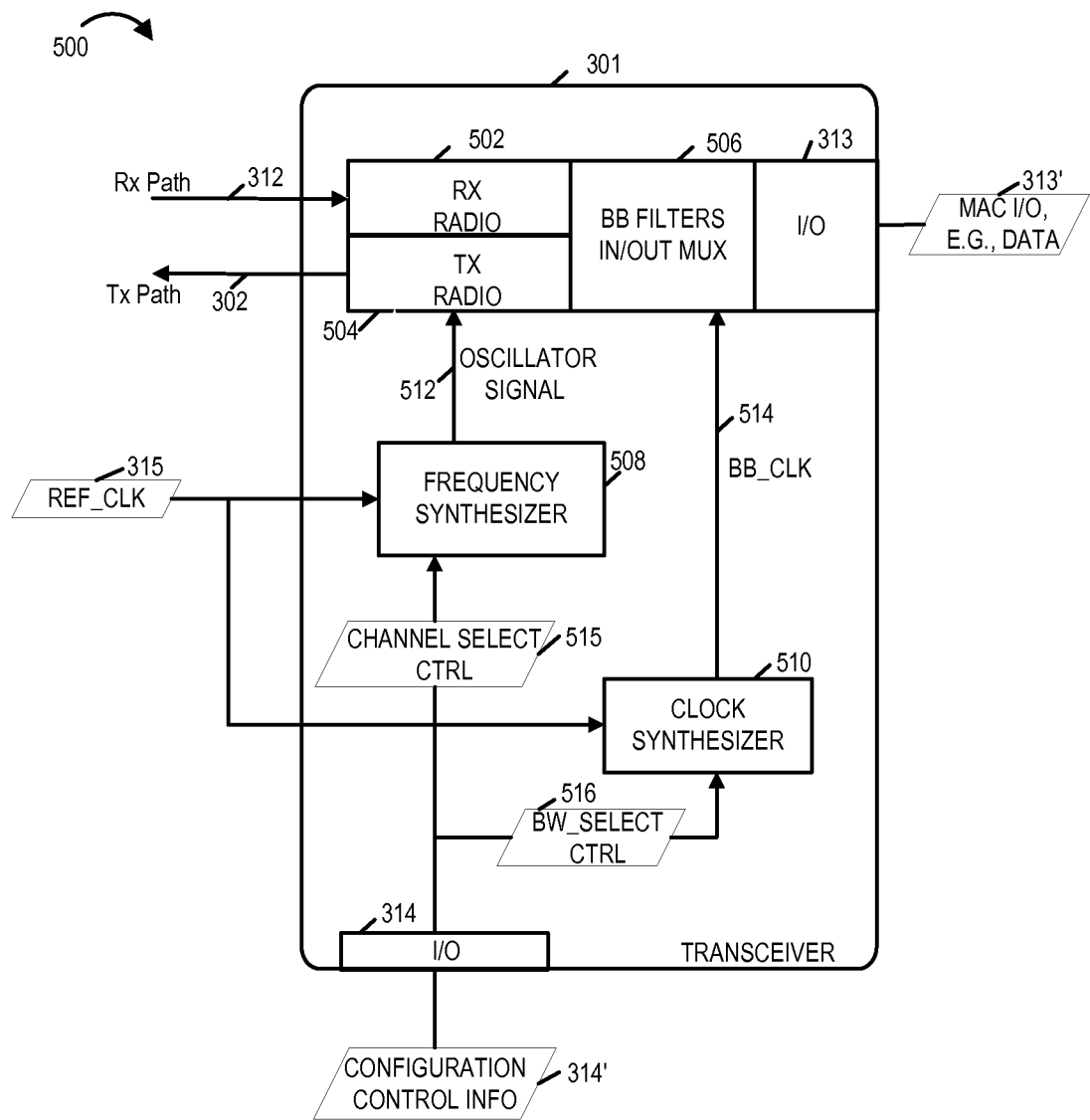
FIG. 5 illustrates a WLAN transceiver, e.g., such as the one used in the exemplary communications device of FIG. 3, in greater detail.

FIG. 5 is a drawing 500 illustrating a WLAN transceiver, e.g., WLAN transceiver 301 used in the exemplary communications device 300, in greater detail. The WLAN transceiver 301 includes a receiver radio unit 502, a transmit radio unit 504, a baseband (BB) processing unit 506 including BB filters and in/out mux, a frequency synthesizer 508, a clock synthesizer unit 510 and interfaces 313 and 314.

The frequency synthesizer 508 is configured to generate the oscillator signal 512 which causes the TX and RX radios 502 and 504 to operate at the carrier frequency of the channel specified by the channel select control value or signal 515. In some embodiments the frequency synthesizer 508 is designed using a phase locked loop architecture and has wide-band operation in some embodiments. The frequency synthesizer 508 receives the reference clock input 315 and generates the output oscillator frequency to control the operation of the Tx Radio and Rx radio units 502, 504 based on the channel select control 515 which is input to the transceiver 301 via configuration I/O interface 314 and the REF_CLK signal 315 supplied to the frequency synthesizer 508 and clock synthesizer 510.

The clock synthesizer unit 510 receives the reference clock input 315 and bandwidth select control information 516, e.g., a bandwidth select control value received as part of the configuration control information 314'. The clock synthesizer 510 generates a baseband clock (BB_CLK) input 514 for controlling the BB (BaseBand) processing unit 506 and filters included therein. In the FIG. 5 example the radio signal input path 312 and transit path 302 are shown while the data input/output is via I/O interface 313 with the data which is transmitted or received being output to the processor and/or other elements of the device 300 via bus 329.

Figure 6:
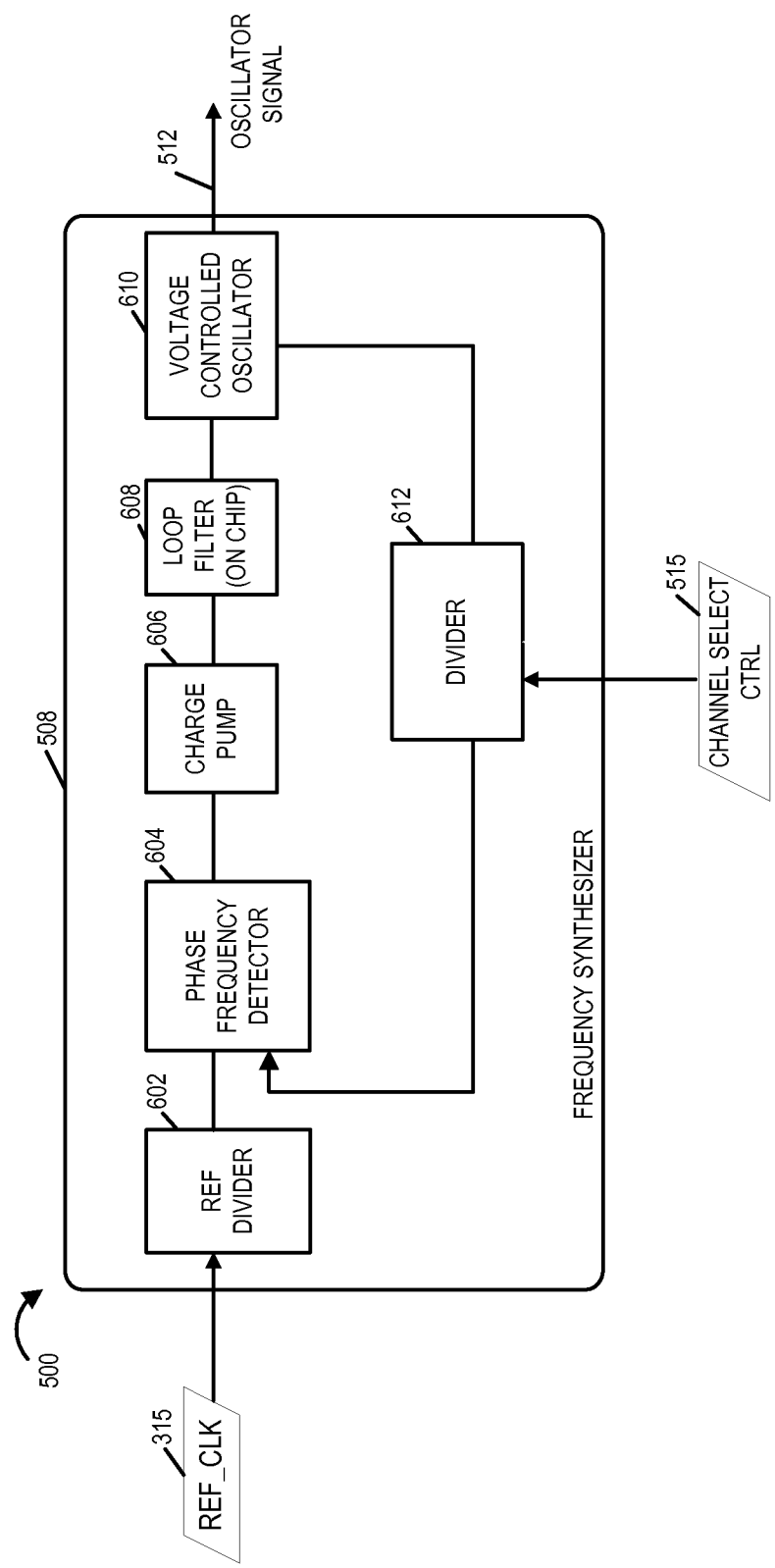
FIG. 6 illustrates a Frequency Synthesizer, e.g., such as the one used in the WLAN transceiver of FIG. 5, in greater detail along with various control and/or configuration inputs to the frequency synthesizer.

FIG. 6 is a drawing 600 illustrating a frequency synthesizer unit, e.g., frequency synthesizer 508 used in the WLAN transceiver 301 in some but not necessarily all embodiments. The frequency synthesizer 508 is implemented using a phase locked loop architecture.

In one embodiment the radio frequency of the channel to be used is controlled by adjusting the frequency of the frequency synthesizer 508, e.g., Phased Lock Loop (PLL) circuit. The frequency synthesizer 508 includes a reference input divider 602, a phase detector 604, a charge pump 606, a loop filter 608, a voltage controlled oscillator (VCO) 610 and a divider 612 coupled together as shown in FIG. 6. The divider 612 is in a feedback path from the VCO 610 to the phase detector 604 and is controlled by the configuration control signal channel select 515 which controls a setting of the divider 612 so that the oscillator signal needed for the desired channel indicated by the signal 515 will be produced by the frequency synthesizer 508.

The reference input divider 602 is placed between the reference clock input 315 and the phase detector 604. The phase detector 604 receives two input signals, e.g., one being the output from the reference divider 602 and the other being the feedback via the divider 612. The phase detector 604 compares two input signals and produces an error signal which is proportional to their phase difference. The error signal is fed to the charge pump 606. The output from the charge pump is then passed through the loop filter 608, e.g., a low-pass filter, and used to drive the VCO 610 which creates an output phase. The output is fed through the divider 612 back to the input of the system, producing a negative feedback loop. Since the divider 612 in the feedback path divides its input by N and the reference input divider 602 divides by M, it allows the PLL to multiply the reference frequency by N/M. The output of the VCO is the oscillator signal 512 discussed above with regard to FIG. 5 which controls what channel is used by the receive and transmit radios 502, 504 of the transceiver 301.

In various embodiments the blocks used in the synthesizer unit, e.g., PLL, are wideband and can be used for wide selection of the frequencies which enable the frequency planning, e.g., in steps of 1 MHz, by changing the reference input to the PLL. In some embodiments the desired carrier frequency is derived by adjusting the pre-scalar (i.e., the divider 612) value in the PLL. The divider 612 value is controlled using the channel select input 515 which is supplied by the configuration control module 322.

In some embodiments by controlling/adjusting the frequency of the PLL in accordance with the features of the invention, a WLAN chipset is controlled to be tuned to various desirable frequency ranges including, e.g., 5 GHz path: 4.4 GHz to 6.6 GHz and 2.4 GHz path: 2.2 GHz to 3.1 GHz. The Frequency selection is done with the Pre-scalar tuning to get the desired frequency.

FIG. 7 is a chart 700 showing various channel select values in column 702 which may be used in the device 300. The channel carrier frequency corresponding to the channel select value shown in each of the individual rows 712, 714, 716, 718, 720 is shown in the second column 704 of the corresponding row. The third column shows various bandwidths that are supported in the exemplary embodiment. The bandwidth to be used at a particular point in time may be specified by a first control value indicating a 5 MHz bandwidth is to be used, a second bandwidth control value indicating that a 10 MHz bandwidth is to be used, a third bandwidth control value indicating that a 20 MHz band with is to be used or a fourth bandwidth control value indicating that a 40 MHz bandwidth is to be used. While the FIG. 7 example shows all of the 4 bandwidths being supported for each channel selection option in other embodiments different numbers of bandwidth selection options may be available for different channels, e.g., some four different bandwidth options may be supported for some channels with two bandwidth options being supported for other channels.

In the FIG. 7 example, 5.900 GHz may be considered the base channel frequency (BCF) with 1 MHz being the supported channel step size. In such an example the carrier frequency of a channel specified by one of the indicated channel select values may be expressed as follows:

$$Fc = BCF + (\text{Channel Select Value} \times 1 \text{ MHz})$$

For example in the case of channel select control value 2, $$Fc = 5.900 \text{ GHz} + 2 \times 1 \text{ MHz} = 5.902 \text{ GHz}$$

Various features of the invention as discussed above provide numerous benefits for the licensed/un-licensed bands. The benefits/advantages include one or more but not necessarily all of the following:

1. Cost reduction of the system as compared to a system using an up/down frequency external to the WLAN chip.

2. Reduction in spurious interference as compared to a system such as the type shown in FIG. 1. The spurious performance is reduced as compared to the system shown in FIG. 1 while allowing for allowing for regulatory limits of 30 dBC to be passed.

3. Benefits in Product Performance: The radio performance of the device 300 can be made to be relatively consistent in terms of the radio specification such as the transmit power and receiver sensitivity over many expected licensed frequency operating ranges.

Thus superior performance maybe obtained as compared to systems where frequency conversion circuits are used to generate desired operational frequencies in which case local oscillator harmonics which are very close to operation frequency of the radio are normally produced. As discussed above suppression of the spurious harmonics of the local oscillator used in an up/down frequency conversion can be very challenging and expensive and are totally or largely avoided with an implementation of the type shown in FIG. 3. Compared to the system shown in FIG. 1, when the features of the invention are used in a device such as the device of FIG. 3 and operation is in the 6 GHz radio frequency band (e.g., 5.9 to 6.4 GHz), significant improvements are observed and the spurious products are relatively low as compared to the FIG. 1 system.

Figure 8:
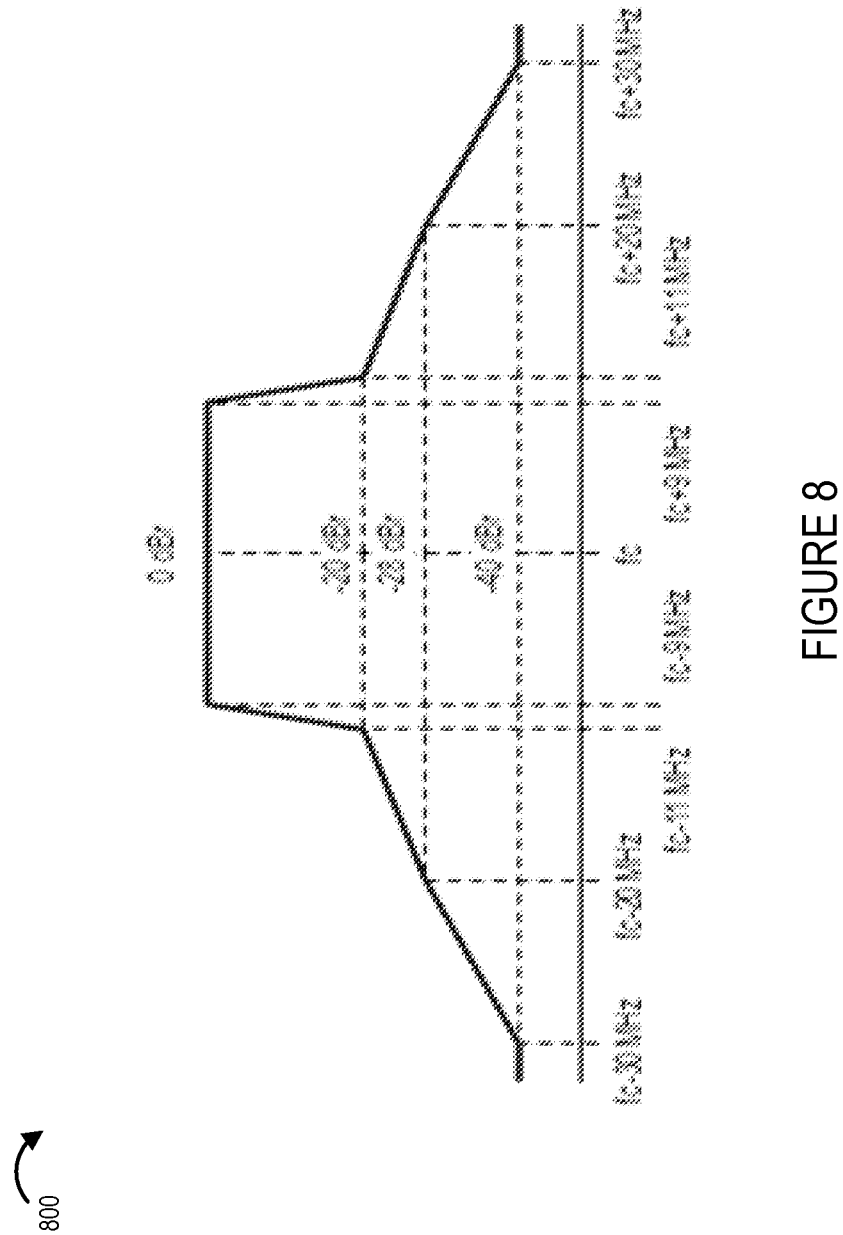
FIG. 8 illustrates an exemplary desired transmit spectral mask for a carrier frequency, fc.

FIG. 8 is a drawing 800 illustrating an example showing transmit spectral mask for a 20 MHZ transmission. The transmit spectrum mask is the power contained in a specified frequency bandwidth at certain offsets, relative to the total carrier power. A test ensuring that a device can meet the spectral mask characteristics shown in FIG. 8 generally allows for a determination to be made that multiple WLAN devices will not unduly interfere with each other. The spectral mask is generally intended to reduce adjacent-channel interference by limiting excessive radiation at frequencies beyond the necessary bandwidth.

In many countries, standards require that when transmitting in a 20 MHz channel, the transmitted spectrum shall have a 0 dBr (where dBr is dB relative to the maximum spectral density of the signal) bandwidth not exceeding 18 MHz (i.e., from fc−9 MHz to fc+9 MHz), −20 dBr at 11 MHz frequency offset, −28 dBr at 20 MHz frequency offset and −40 dBr at 30 MHz frequency offset and above. The transmitted spectral density of the transmitted signal shall fall within the spectral mask, as shown in Figure. The measurements shall be made using a 100 kHz resolution bandwidth and a 30 kHz video bandwidth.

The Regulatory requirements will vary from country to country. Most of the cases the requirements will be similar lines. The spurious products of the radio should not be as per the definitions below.

The spurious product requirements in one exemplary embodiment are as discussed below.

Transmitter leakage radiation level should not exceed as below.

With in frequency range:
0.03 GHz-1 GHz −40 dB
1 GHz-26.5 GHz −30 dB

The FIG. 1 embodiment has the spurious products from the local oscillator harmonics which are close to the operation frequency and those are very tough to reject them to meet the requirement of the rejection as 30 dBc.

The exemplary embodiment shown in FIG. 3 does not suffer the same harmonic problems as the FIG. 1 system since the use of a frequency up/down converter is avoided making it easier to satisfy the spectral requirements without expensive filters.

The exemplary system shown in FIG. 3 can use a standard reference platform, i.e., transceiver chip or chipset, from any one of a large number of low cost WLAN based radio platforms or WLAN chip providers with the control parameters that are used allowing for a wide range of frequencies to be supported.

In combination with the power control features discussed above with regard to the FIG. 3 embodiment, the methods and configurations described herein allow for relatively low cost radio systems and devices which can be for in licensed frequency spectrum outside the original intended frequency band of the WLAN chip or chip set used to implement a device or system in accordance with the invention. This allows for supporting custom bandwidth, i.e., customized use of licensed frequency spectrum, with expected throughput performance at a relatively low cost as compared to the cost of designing a custom chip for a particular licensed frequency band.

Figure 10A:
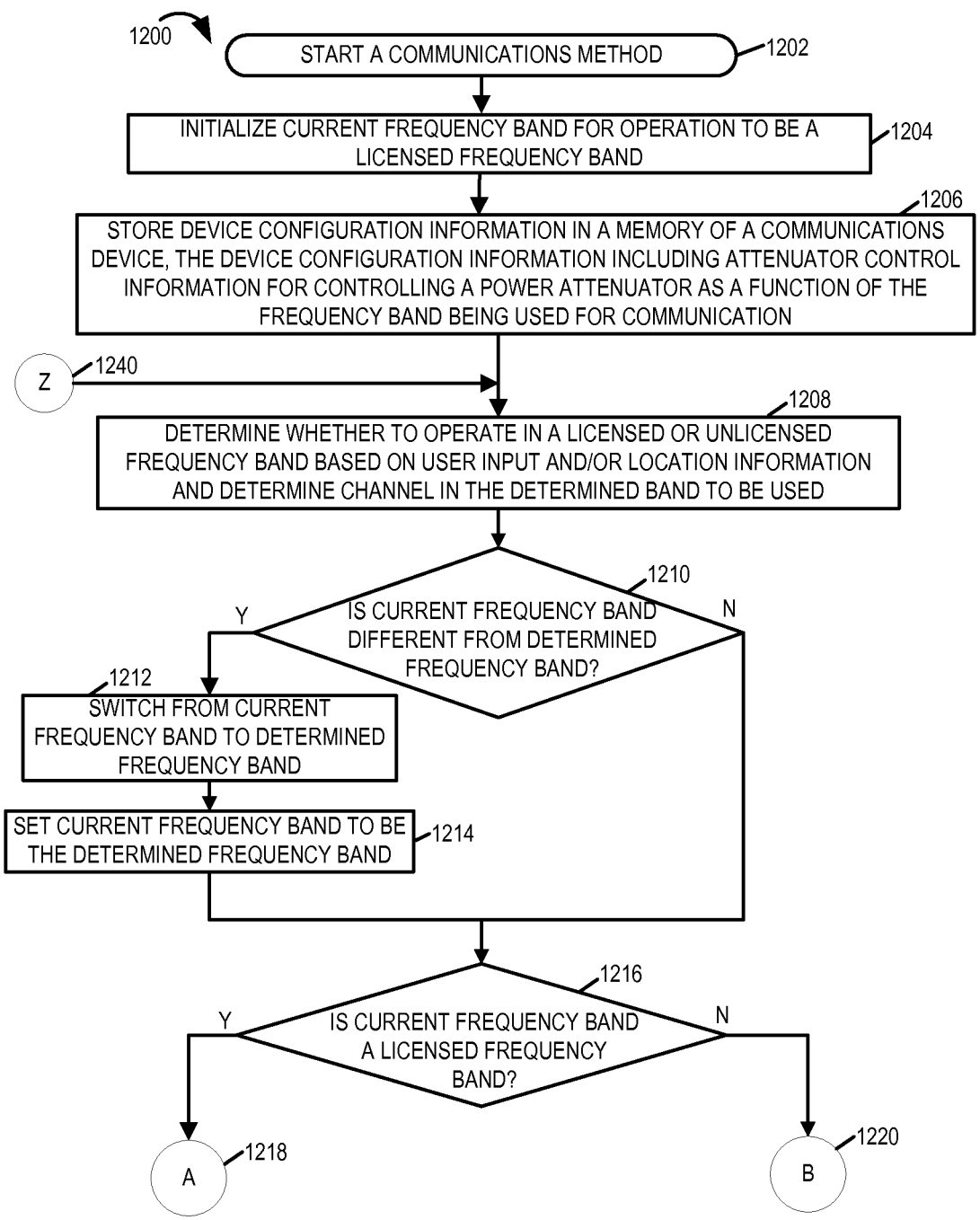
FIG. 10, which comprises the combination of FIGS. 10A, 10B and 10C, is a flowchart illustrating the steps of an exemplary method which can be performed by an exemplary communications device in accordance with the invention.
Figure 10B:
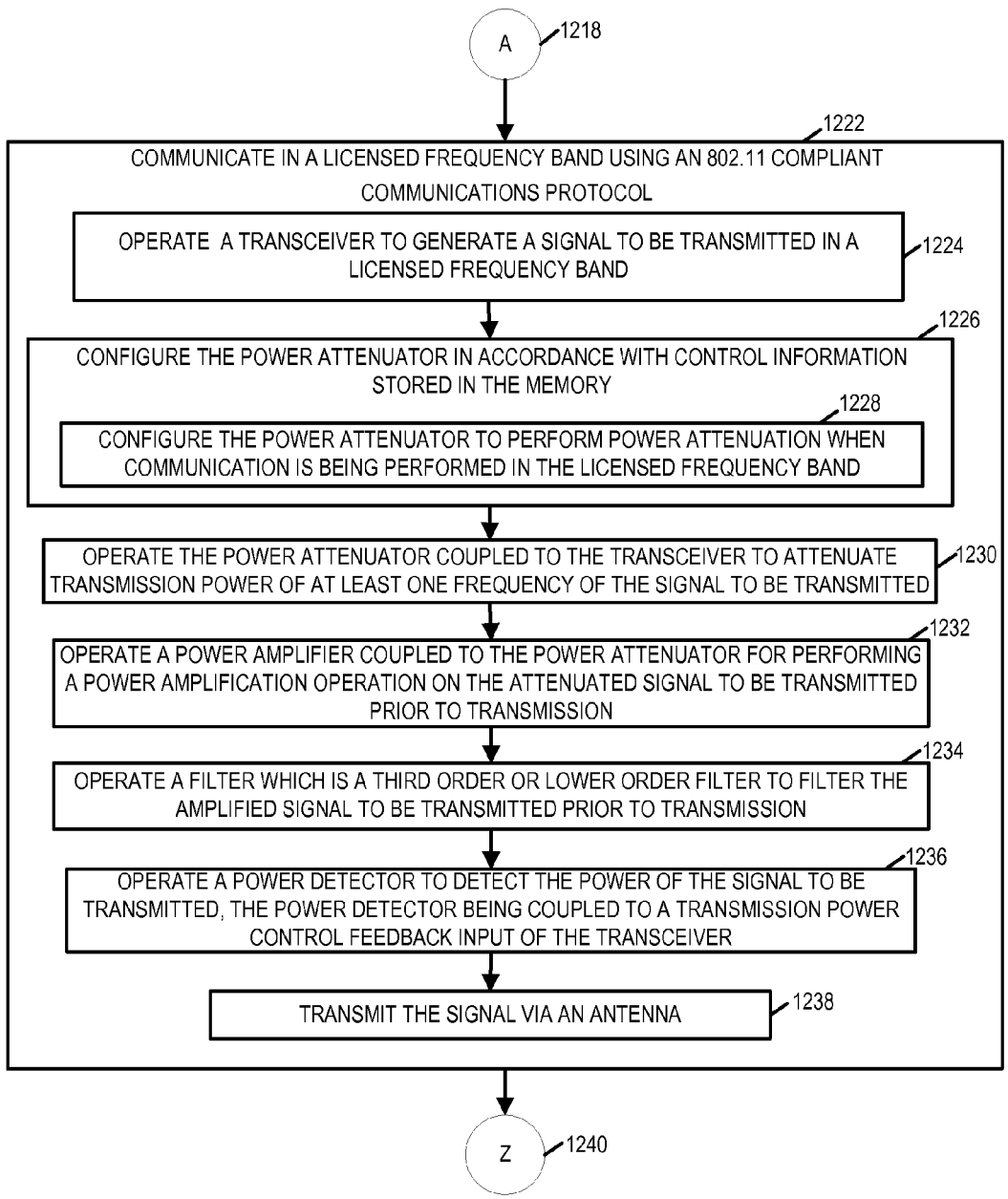
Figure 10C:
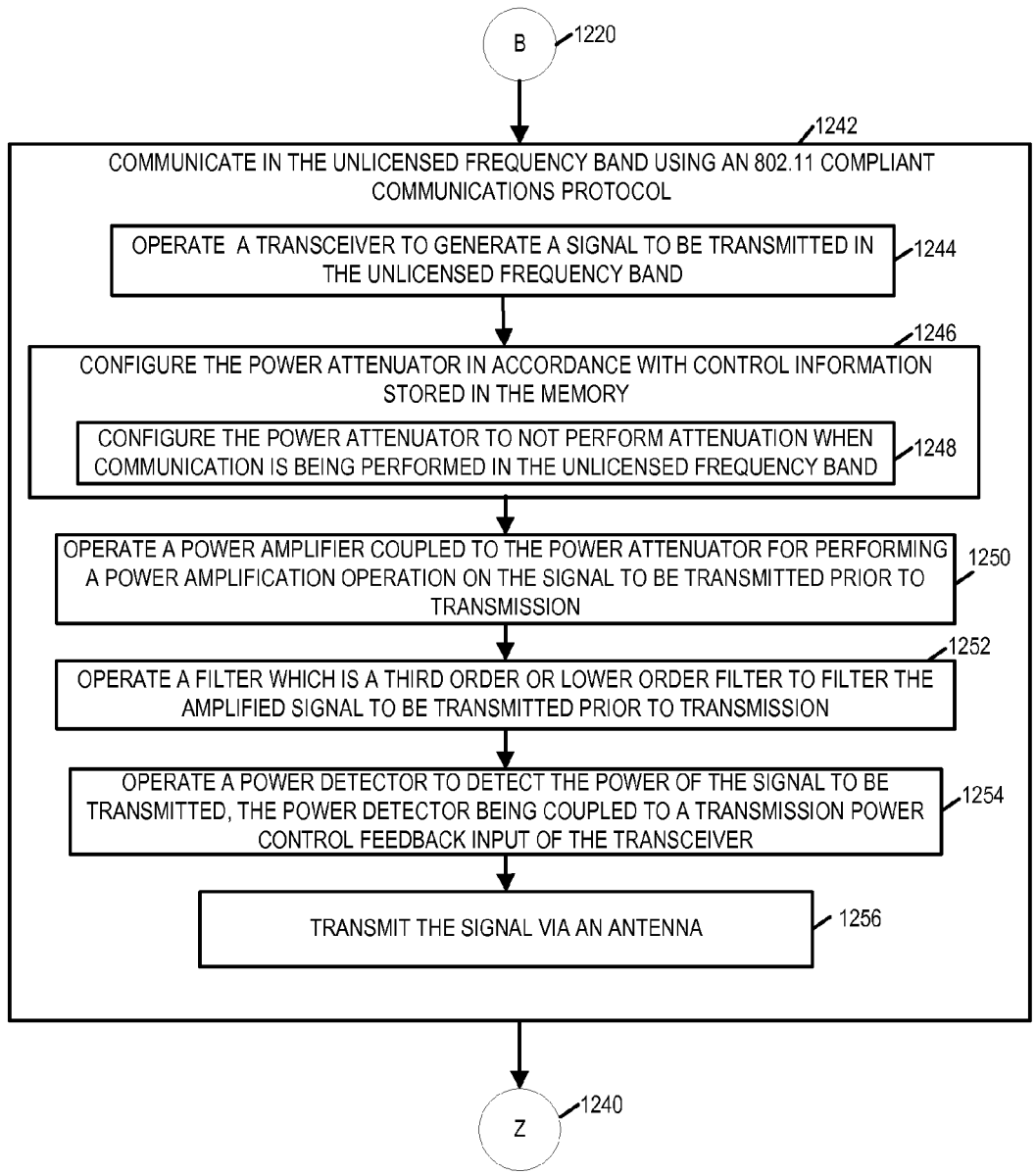

One exemplary embodiment will now be described with reference to FIG. 10. FIG. 10 which comprises the combination of FIGS. 10A, 10B and 10C, is a flowchart 1200 illustrating the steps of an exemplary communications method in accordance with the invention. The method of flowchart 1200 can be, and in some embodiments is, performed by an exemplary communications device such as the device 300 of FIG. 3. The exemplary method starts in step 1202 where the device is powered on and initialized. Operation proceeds from step 1202 to step 1204. In step 1204 the current frequency band for device operation is initialized and set to be a licensed frequency band. This may be set as a default setting so that when the device is turned on a licensed frequency band is used for communications. It should be appreciated that in step 1204 the operational frequency band is set to be a frequency band in the licensed spectrum for illustration and discussion purposes only and the frequency band may be set to be an unlicensed band as well.

Operation proceeds from step 1204 to step 1206. In step 1206 device configuration information is stored in a memory, e.g., device memory, the device configuration information including attenuator control information for controlling a power attenuator as a function of the frequency band being used for communication. The configuration information may include additional control information as illustrated and discussed with regard to FIG. 9.

Operation proceeds from step 1206 to step 1208. In step 1208 it is determined whether to operate in a licensed band or an unlicensed frequency band based on user input and/or location information. Further a determination regarding a channel in the determined frequency band to be used. Thus the determination whether to operate in a licensed or an unlicensed frequency band can be made using a user selected option and/or based on the location where the communications device is currently operating. In some embodiments the current location may be determined using a GPS receiver.

Operation proceeds from step 1208 to step 1210. In step 1210 it is determined if the currently set operational frequency band is different from the determined frequency band. If it is determined that the current frequency band is different, the operation proceeds to step 1212 otherwise the operation proceeds from step 1210 to step 1216. In step 1212 the device controls the radio unit, e.g., the WLAN radio unit, to switch the frequency of operation from the current frequency band to the determined frequency band. Operation proceeds from step 1212 to step 1214. In step 1214 the device resets the initially set operational frequency band from the current to the determined frequency band. For example if unlicensed frequency band is the frequency band initially set for use in communications and the device switches to a licensed band based on the determination performed in step 208, then step 1214 updates a current frequency band indicator to reflect that the current frequency band is the licensed band.

Operation proceeds from step 1214 to step 1216. In step 1216 the device performs a check to determine if the determined frequency band that is set as the current frequency band for operation is the licensed frequency band. If it is determined that the current frequency band is the licensed frequency band the operation proceeds from step 1216 to step 1222 via connecting node A 1218, otherwise the operation proceeds to step 1242 via connecting node B 1220.

In step 1222, the device is operated to communicate in a licensed frequency band using an 802.11 compliant communications protocol. As part of communicating in the licensed band in accordance with the invention, one or more of the steps 1224, 1226, 1228, 1230, 1232, 1234, 1236, 1238 are performed in some embodiments. As part of the communicating step 1222, in step 1224 a transceiver of the device is operated to generate a signal to be transmitted in the licensed band. In various embodiments the transceiver is a WLAN chip. In some embodiments the transceiver is a chip which is compliant with at least one IEEE 802.11 standard. In some embodiments the transceiver is designed to operate in a frequency band which is lower than 5.9 GHZ. In some embodiments the licensed frequency band is a frequency band which includes frequencies higher than 5.9 GHz. In various embodiments the power of the signal generated by the transceiver varies as a function of frequency. Operation proceeds to step 1226 where a power attenuator, e.g., power attenuator 305, is configured in accordance with configuration/control information stored in memory. In step 1228 which is performed as part of the 1226, the power attenuator is configured, using configuration/control information, to perform power attenuation when communication is being performed in the licensed frequency band. Various sets of attenuation information for different frequency bands may be stored in the device memory with the appropriate attenuator configuration information being supplied to the attenuator on an as needed basis, e.g., when the frequency band used for transmission is changed. Next in step 1230 the power attenuator is controlled to attenuate transmission power of at least one frequency of the signal to be transmitted. Thus when the device operates in a licensed frequency band, the configuration/control information configures the power attenuator to attenuate one or more frequencies of the signal to be transmitted to achieve a more uniform power distribution across frequencies before power amplification.

Operation proceeds to step 1232 where a power amplifier, coupled to the power attenuator, is operated to amplify the attenuated signal output from the attenuator prior to transmission of the signal. The power amplifier may be a single or multi-stage power amplifier with generally uniform amplification characteristics across the frequency band or bands in which a signal may be transmitted. Next in step 1234 a filter, e.g., low pass filter, in the transmit chain is operated to filter the amplified signal output from the power amplifier prior to transmission of the signal. In various embodiments the filter performing the filtering operation is a low pass third order or lower order filter.

Operation proceeds to step 1236. In step 1236 a power detector is operated to detect the power of the signal to be transmitted. In various embodiments the power detector receives a portion of the transmit signal via a directional coupler. In various embodiments the power detector output is coupled to a transmission power control feedback input of the transceiver. Thus the power detector detects the power of the signal being transmitted and provides a feedback to the transceiver. Operation proceeds to step 1238 where the signal is transmitted via an antenna. In various embodiments the power attenuator, power amplifier and the filter form a transmit communications path which supplies the signal to be transmitted to the antenna. In various embodiments the transmit communications path does not include a frequency up converter or frequency down converter. Operation proceeds from step 1238 back to step 1208 via connecting node Z 1240 and the operation may continue in the discussed manner depending on communication needs.

Referring now to FIG. 10C which illustrate the steps performed in accordance with the invention when the device operates in the unlicensed band for communications. In step 1242, the device is operated to communicate in an unlicensed frequency band using a 802.11 compliant communications protocol. As part of communicating in the unlicensed frequency band in accordance with the invention, one or more of the steps 1244 through 1256 are performed in some embodiments. In step 1244 a transceiver of the device is operated to generate a signal to be transmitted in the unlicensed frequency band. When operating in the unlicensed band the WLAN transceiver normally generates a signal to be transmitted which will have a relatively uniform power with respect to frequency. Operation proceeds from step 1244 to step 1246 where a power attenuator, e.g., power attenuator 305, is configured in accordance with configuration/control information stored in memory. In step 1248 which is performed as part of the 1246, the power attenuator is configured, using configuration/control information, to not perform power attenuation when communication is being performed in the unlicensed frequency band.

Next in step 1250 a power amplifier, coupled to the power attenuator, is operated to amplify the signal to be transmitted prior to transmission. The power amplifier may be a single or multi-stage power amplifier with generally uniform amplification characteristics across the frequency band or bands in which a signal may be transmitted. Next in step 1252 a filter, e.g., low pass filter, in the transmit chain is operated to filter the amplified signal output from the power amplifier prior to transmission of the signal. In various embodiments the filter performing the filtering operation is a low pass third order or lower order filter.

Operation proceeds to step 1254. In step 1254 a power detector is operated to detect the power of the signal to be transmitted. The power detector detects the power of the signal being transmitted and provides a feedback to the transceiver. Operation proceeds to step 1256 where the signal is transmitted via an antenna. Operation proceeds from step 1256 back to step 1208 via connecting node Z 1240.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

At least some of the methods and apparatus of various embodiments are applicable to a wide range of communications systems including many OFDM as well as non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A wireless communications device, comprising:
   a transceiver configured to generate a signal to be transmitted in a licensed frequency band, power of said signal generated by the transceiver varying as a function of frequency;
   a power attenuator coupled to said transceiver for attenuating transmission power of at least one frequency of said signal to be transmitted, said power attenuator producing an attenuated signal to be transmitted;
   a power amplifier coupled to said power attenuator for performing a power amplification operation on the attenuated signal to be transmitted prior to transmission, said power amplifier producing an amplified signal to be transmitted;
   a filter which is a third or lower order filter configured to filter the amplified signal to be transmitted prior to transmission, said filter producing a filtered signal to be transmitted;
   an antenna, said power attenuator, power amplifier and filter forming a transmit communications path which processes the signal to be transmitted and supplies the filtered signal to be transmitted to said antenna, said transmit communications path not including a frequency up converter or frequency down converter;
   a memory including device configuration information, said device configuration information including attenuator control information for controlling said power attenuator as a function of the frequency band being used for communication; and
   a configuration control module for controlling said power attenuator to perform power attenuation when communication is being performed in a licensed frequency band and for controlling said power attenuator to perform no attenuation when communication is being performed in an unlicensed frequency band.

2. The wireless communications device of claim 1, wherein said transceiver is a wireless local area network (WLAN) chip.

3. The wireless communications device of claim 1, wherein said transceiver is a chip which is compliant with at least one IEEE 802.11 standard.

4. The wireless communications device of claim 1, wherein said transceiver is designed to operate in a frequency band which is lower than 5.9 GHZ, and wherein said licensed frequency band is a frequency band which includes frequencies higher than 5.9 GHz.

5. The wireless communications device of claim 4, further comprising:
   a power detector for detecting the power of the filtered signal to be transmitted, said power detector being coupled to a transmission power control feedback input of said transceiver.

6. A communications method, the method comprising:
   storing, in a memory, device configuration information, said device configuration information including attenuator control information for controlling a power attenuator as a function of the frequency band being used for communication;
   configuring said power attenuator in accordance with control information stored in said memory, said configuring including configuring said power attenuator to perform power attenuation when communication is being performed in a licensed frequency band and not to perform attenuation when communication is being performed in an unlicensed frequency band;
   operating a transceiver to generate a signal to be transmitted in a licensed frequency band, the power of said signal generated by the transceiver varying as a function of frequency;
   operating the power attenuator coupled to said transceiver to attenuate transmission power of at least one frequency of said signal to be transmitted, said power attenuator producing an attenuated signal to be transmitted;
   operating a power amplifier coupled to said power attenuator for performing a power amplification operation on the attenuated signal to be transmitted prior to transmission, said power amplifier producing an amplified signal to be transmitted;

operating a filter which is a third order or lower order filter to filter the amplified signal to be transmitted prior to transmission, said filter producing a filtered signal to be transmitted; and transmitting said filtered signal to be transmitted via an antenna, said power attenuator, power amplifier and filter forming a transmit communications path which processes the signal to be transmitted and supplies the filtered signal to be transmitted to said antenna, said transmit communications path not including a frequency up converter or frequency down converter.

7. The method claim 6, wherein said transceiver is a wireless local area network (WLAN) chip.

8. The method of claim 6, wherein said transceiver is a chip which is compliant with at least one IEEE 802.11 standard.

9. The method of claim 6, wherein said transceiver is designed to operate in a frequency band which is lower than 5.9 GHZ, and wherein said licensed frequency band is a frequency band which includes frequencies higher than 5.9 GHz.

10. The method of claim 9, further comprising:
operating a power detector to detect the power of the filtered signal to be transmitted, said power detector being coupled to a transmission power control feedback input of said transceiver.

11. The method of claim 6 further comprising:
communicating in said licensed frequency band using an 802.11 compliant communications protocol;
switching between communicating in said licensed frequency band and an unlicensed frequency band; and
communicating in said unlicensed frequency band using said 802.11 compliant communications protocol.

* * * * *